Jan. 29, 1957 P. THOMAS 2,779,587
AUTOMATIC AUTO STABILIZER AND SHOCK ABSORBER
Filed May 7, 1954
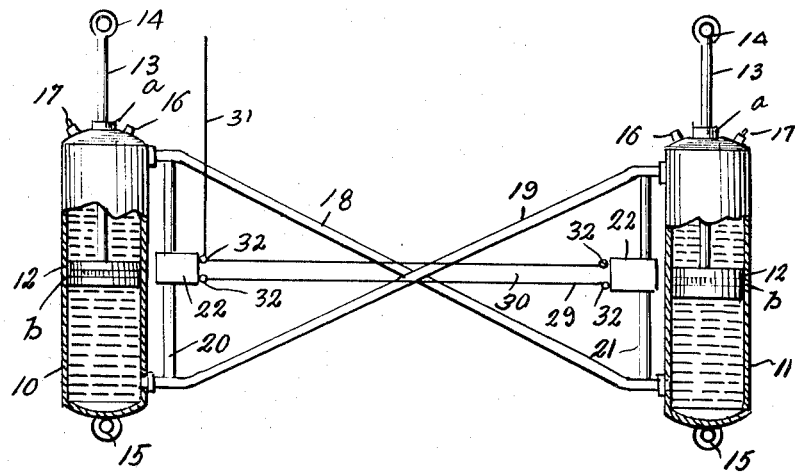
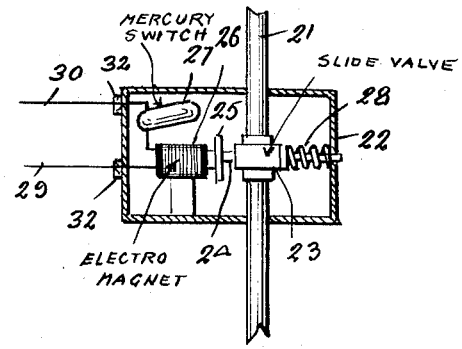
INVENTOR.
PHILIP THOMAS
BY
Patrick D. Beavers
ATTORNEY

United States Patent Office 2,779,587
Patented Jan. 29, 1957

2,779,587

AUTOMATIC AUTO STABILIZER AND SHOCK ABSORBER

Philip Thomas, Flint, Mich.

Application May 7, 1954, Serial No. 428,291

1 Claim. (Cl. 267—11)

This invention relates to improvements in shock absorbers which are intended for use with vehicles such as automobiles, trucks, etc.

An object of this invention is to provide a combination stabilizer and shock absorber that may be applied to either the front or the rear of the vehicle, or to both front and rear of the vehicle.

Another object of the invention is to properly stabilize the vehicle through equal pressure in the shock absorber when it is positioned between the frame and the suspension springs of the vehicle.

The present invention is adapted to be connected to a vehicle in the same manner as are the so-called airplane type shock absorbers.

Another object of the invention is to provide shock absorbers which are controlled by centrifugally operated mercury switches which in turn will cause electromagnetic valves to by-pass the fluid to the shock absorbers to stabilize the vehicle.

With the above and other objects and advantages in view the invention consists of the minor details of construction, arrangement and combination of parts more fully hereinafter described, claimed and illustrated in the accompanying drawing in which:

Fig. 1 is an elevational view, partly in section, of the shock absorber embodying the invention; and Fig. 2 is a detailed sectional view, with parts broken away, of the centrifugally operated mercury switch and electromagnetic valve.

Referring more in detail to the drawings, wherein like parts are designated by like reference numerals the invention is shown to comprise a pair of cylinders 10 and 11, respectively. Each of the cylinders has a plunger 12 operating therein and each plunger is provided with a fluid seal ring b and with a piston rod 13, which extends outwardly of each cylinder through a packing nut a and has an eye 14 thereon which is adapted to be connected to the vehicle.

The end of the cylinder opposite to the end from which the piston rod extends is also provided with an eye 15 which will be connected to the vehicle. The eyes 14 and 15 are similar to the eyes that are found on airplane type shock absorbers, and thus the eyes 14 on the piston rods and the eyes 15 on the cylinders will be connected to the vehicle in the same manner as the airplane type shock absorbers are connected to the vehicle.

Each cylinder is provided with an air bleed valve 16 and a filler valve plug 17 which is similar in construction and operation to an "Alemite" or other type of grease fitting.

Initially the filler valve plugs 17 are removed and the cylinders are filled with fluid preferably oil of the type that is conventionally used in shock absorbers. The filler valve plugs 17 are then inserted into their respective openings and fluid under pressure is impelled through the filler valve plugs 17 causing any air that is within the cylinders to be forced outwardly through the air bleed valves 16.

A conduit 18 connects the upper part of the cylinder 10 with the lower part of the cylinder 11 and a similar conduit 19 connects the lower part of the cylinder 10 with the upper part of the cylinder 11, the conduits extending in cross relation to each other as in Fig. 1.

A calibrated by-pass conduit 20, positioned in parallel relation to the cylinder 10, is connected at the upper end thereof to the upper end of the conduit 18 and at the lower end thereof to the lower end of the conduit 19.

A second calibrated by-pass conduit 21, positioned in parallel relation to the cylinder 11, is connected at the upper end thereof to the upper end of the conduit 19 and at the lower end thereof to the lower end of the conduit 18.

Referring to Fig. 1, it will be noted that a valve housing 22 is mounted on each of the by-pass conduits 20 and 21 and for purposes of describing the structure of the valve within the housing 22 only one structure will be described since both are similar in construction.

For a detailed description of the valve housing 22 and the valve mechanism therein reference is had to Fig. 2, wherein the valve housing 22, for the purpose of illustration, is shown installed on the conduit 21.

Interposed in the conduit 21, within the valve housing 22, is a slide valve 23. A stem 24 connected to the slide valve 23 has a disc 25 thereon, which is attracted by an electromagnet 26 to close the valve when the electromagnet 26 is energized by reason of the operation of a mercury switch 27. The opposite end of the stem 24 has a spring 28 connected thereto to cause the valve 23 to move to open position when the electromagnet is de-energized. The mercury switch 27 is pivotally mounted in the housing 22 so that through the medium of centrifugal force the switch will be tilted to make or break the circuit to the electromagnet 26 to close the valve and permit subsequent opening thereof through the medium of the spring 28 when the circuit is broken.

Since the operation of the invention requires simultaneous operation of the electromagnets 26, the same are connected in series by the lead 29. Since it is desired to operate the electromagnets 26 simultaneously by either of the mercury switches 27, the mercury switches are connected in series by a lead 30, current being supplied to the lead 30 from the battery of the vehicle by the lead 31. Connection posts 32 being provided on each of the valve housings 21 for the connection of the leads 29 and 30 to their respective electromagnets 26 and mercury switches 27 as previously described.

Under normal operation, with the slide valve 23 open in each by-pass conduit 20 and 21, respectively, each wheel will have independent shock absorbing action by the passage of the oil from the top of each cylinder to the bottom of each cylinder through the calibrated conduits 20 and 21, respectively.

When the vehicle is cornering hard or under increased speed the vehicle should tend to lean to one side or the other the centrifugal force would cause the mercury switch or switches to make the circuit to the electromagnets and cause the slide valves 23 to be closed.

The result of this action and the structure described as the plunger of either cylinder is forced upwardly, the fluid in that cylinder will be displaced from the upper portion of that cylinder to the lower portion of the companion cylinder creating a tendency for the plunger in the companion cylinder to be forced upwardly simultaneously with the other plunger. Such action will also work conversely, for the movement of either cylinder creates the movement of the oil from the top portion of one cylinder to the lower portion of the other cylinder thus stabilizing the vehicle.

Thus it will be noted that the interconnections of the conduits and cylinders are such that when the valves 23 are closed, the plungers 12 will move more or less in unison. Thus, the tilting of the vehicle is distributed between the two cylinders so that any shock or tilt is dissipated in the interchange of the oil between the cylinders.

It is believed that the structure, operation and purpose of the invention will be obvious to those skilled in the art and it is to be understood that changes in the minor details of construction, arrangement and combination of parts may be resorted to provided they fall within the spirit of the invention and the scope of the appended claim.

Having thus described the invention what is claimed as new and desired to be secured by Letters Patent is:

In a vehicle stabilizer and shock absorber, a pair of companion cylinders, a double acting plunger in each cylinder, means connecting the lower part of one cylinder to the upper part of the second cylinder, means connecting the lower part of the second cylinder to the upper part of the first cylinder, a by-pass conduit adjacent and parallel to each cylinder, each by-pass conduit connected to the means connected to the upper and lower parts of the cylinder, fluid in said cylinders, a valve mounted in each by-pass conduit, a valve housing affixed to each conduit and enclosing said valve, an electromagnet mounted in each housing for closing its associated valve, a spring mounted in each housing for normally urging its associated valve to open position, and a mercury switch pivotally mounted in each housing and adapted to close an electrical circuit to its associated electromagnet when said switch is tilted, said magnets and said switches all being in series.

References Cited in the file of this patent

UNITED STATES PATENTS

| | | |
|---|---|---|
| 2,073,180 | Rink | Mar. 9, 1937 |
| 2,077,969 | Tibbetts | Apr. 20, 1937 |
| 2,257,773 | Wolf | Oct. 7, 1941 |

FOREIGN PATENTS

| | | |
|---|---|---|
| 726,770 | France | Mar. 8, 1932 |